(12) United States Patent
Sahoo et al.

(10) Patent No.: US 11,030,070 B2
(45) Date of Patent: Jun. 8, 2021

(54) APPLICATION HEALTH MONITORING BASED ON HISTORICAL APPLICATION HEALTH DATA AND APPLICATION LOGS

(71) Applicant: VMWARE, INC., Palo Alto, CA (US)

(72) Inventors: Sidhartha Sahoo, Bangalore (IN); Vipul Chaudhary, Bangalore (IN); Sandeep L Hegde, Bangalore (IN); Vimal Das Kammath Veerakumar, Bangalore (IN); Arunvijai Sridharan, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 409 days.

(21) Appl. No.: 16/000,916

(22) Filed: Jun. 6, 2018

(65) Prior Publication Data

US 2019/0377652 A1 Dec. 12, 2019

(51) Int. Cl.
*G06F 11/34* (2006.01)
*G06F 11/36* (2006.01)
*G06N 20/00* (2019.01)

(52) U.S. Cl.
CPC ...... *G06F 11/3409* (2013.01); *G06F 11/3447* (2013.01); *G06F 11/3476* (2013.01); *G06F 11/3688* (2013.01); *G06N 20/00* (2019.01)

(58) Field of Classification Search
CPC ............ G06F 11/3409; G06F 11/3447; G06F 11/3688; G06F 11/3476
See application file for complete search history.

(56) References Cited

U.S. PATENT DOCUMENTS

| 2015/0212920 A1* | 7/2015 | Kraus ..................... G06F 11/36 717/127 |
| 2018/0122517 A1* | 5/2018 | Bessette .................. G06F 19/00 |

* cited by examiner

*Primary Examiner* — Manuel A Rivera Vargas

(57) ABSTRACT

Techniques for monitoring health of an application based on historical application health data and application logs are disclosed. In one embodiment, the historical application health data and the historical application logs associated with a period may be obtained. The application may include multiple services running therein. Priority of services may be determined based on the historical application health data associated with a portion of the period. Priority of exceptions associated with each of the services may be determined based on the historical application health data and the historical application logs associated with the portion of the period. Further, an application regression model may be trained by correlating the priority of the services, the associated priority of the exceptions, and the corresponding historical application health data. The health of the application may be monitored by analyzing real-time application logs using tested application regression model.

23 Claims, 7 Drawing Sheets

APPLICATION HEALTH MONITORING BASED ON HISTORICAL APPLICATION HEALTH DATA AND APPLICATION LOGS

TECHNICAL FIELD

The present disclosure relates to computing environments, and more particularly to methods, techniques, and systems for monitoring health of an application based on historical application health data and application logs in the computing environments.

BACKGROUND

Monitoring health of an application in computing environments is a process to ensure that the application processes and performs in an expected manner. For example, in case of critical applications, transaction errors and outages can lead to loss in productivity, customer loyalty, and revenue. In such scenarios, monitoring health of the application may help to reduce mean time to resolution (MTTR) of application issues and provide a quick resolution to the application issues. Further, the application may include multiple services running therein. The health of the application may also depend on the performance of the services. In such cases, monitoring performance/health of the application can be challenging as the application may include various services that can affect its performance.

Figure 1:
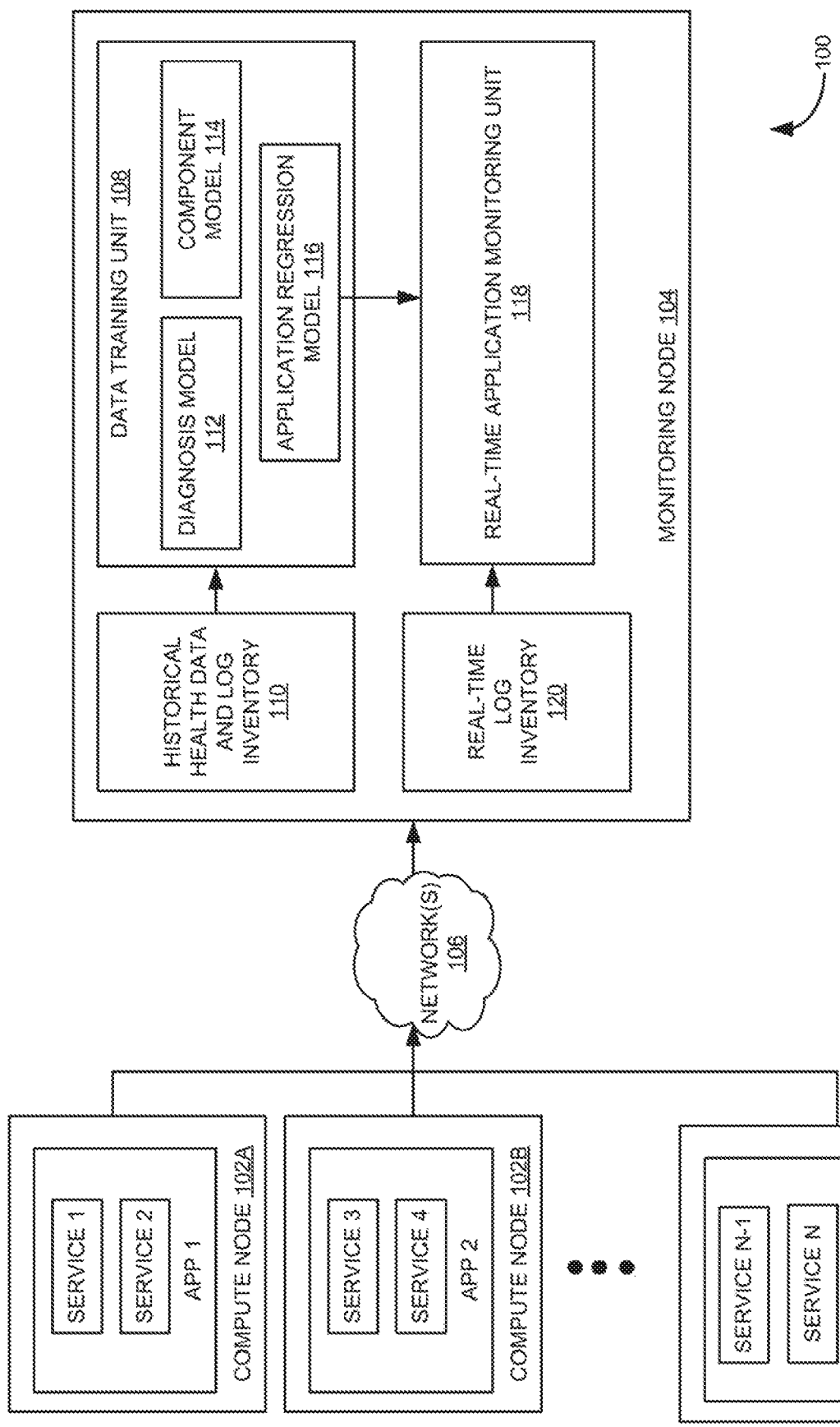
FIG. 1 is a system view of an example computing environment illustrating a monitoring node to monitor health of an application based on historical application health data and application logs.

The drawings described herein are for illustration purposes only and are not intended to limit the scope of the present subject matter in any way.

DETAILED DESCRIPTION

Embodiments described herein may provide an enhanced computer-based and network-based method, technique, and system for monitoring health of an application based on historical application health data and application logs in a computing environment. The computing environment may be a networked computing environment such as an enterprise computing environment, a cloud computing environment, a virtualized environment, a cross-cloud computing environment, or the like. Monitoring the health of the application may identify, measure, and evaluate the performance of the application and provide a means to isolate and rectify abnormalities or shortcomings. Application health monitoring may be referred as application performance monitoring (APM) and/or application performance management (APM).

With evolving network growth and matured computation virtualization techniques, applications have become more complex. Each of the applications may include various services running therein. For example, VMware® vCenter server application may include services such as VMware vSphere® client, VMware virtual storage area network (VMware VSAN™) health service, VMware vmon, and the like running therein. Some of these services may affect the overall functioning of the vCenter server application while others may not significantly affect the vCenter server application's health. Hence, the health of the application may directly depend on the health of the services running therein. For example, performance failure of a critical service may affect the performance of the application.

Further, different exceptions may occur during execution of the services in the application. An exception is an event, which occurs during the execution of a service, that can disrupt the normal flow of the service's functionality. Examples of exceptions can be "index out of bounds", "null pointer exception", "out of memory error", and the like. Therefore, the health of the service may depend on different kinds of exceptions. In such scenarios, determining the health of the services based on various exceptions may play a role in monitoring or predicting the health of the application.

Some methods for monitoring the health of the application may include installing an agent on a compute node (e.g., physical computer) where the application is running. The agent may include multiple scripts which help the agent to get the application specific performance and health monitoring data. The health monitoring data may be periodically fetched from the applications using application specific or operating system commands and pushed to a manager software as time series metric objects. However, the agents deployed on the physical servers may consume additional computing resources, generate overhead, and provide less security.

In some other methods for monitoring the health of the application, the applications themselves may provide application health data via exposed application programming interfaces (APIs). These APIs can then be consumed by a manager software periodically to derive application health. Further, the manager software may store, process, and analyze the application health data using specific algorithms and provide user insights about application performance, capacity, and configuration management capabilities. Also, application health insights may be provided through dashboards, reports, and alerting engines via continuously tracking of application specific data. The manager software may divide the application health and efficiency into availability (e.g., indicating the application is up and running) and usability (e.g., indicating that the application functions properly in terms of performance, configuration, security, and compliance). An example for usability may include monitoring a database for a number of active connections and correlating the active connections with central processing unit (CPU) usage. However, such methods may be less scalable, include capabilities limited to what can be achieved by running system scripts or application APIs, and/or include complex life cycle management.

Examples described herein may eliminate the need for installing an additional software program/agent on compute nodes to monitor the health of the applications. Examples described herein may monitor the health of the application based on historical application health data and application logs/log files along with associated services logs. The application logs may be generated by the application and may include events that occur during execution of the application. For example, an application log may refer to a file of events that are logged by the application (i.e., software application). Further, the application log may include relevant and recent information on the errors, exceptions, anomalies, and the like.

Examples described herein may obtain the historical application health data and the historical application logs associated with the application, analyze the historical application health data and the historical application logs using a trained diagnosis model and a component model to determine priority of services and priority of exceptions, and train an application regression model by correlating the priority of the services, the associated priority of the exceptions, and the corresponding historical application health data. Further, health of the application may be monitored using the trained application regression model upon testing the trained application regression model.

Examples described herein may employ supervised machine learning techniques and natural language processing techniques to train the diagnosis model and the component model which can scan the historical application health data and application logs for monitoring the health of the application. Further, examples described herein may employ the supervised machine learning and the natural language processing techniques to train the application regression model which can scan the real-time application logs for monitoring the health of the application. The terms "diagnosis model", "component model", and "application regression model" may refer to bots (e.g., a piece of software) that can execute commands to perform routine tasks either automatically or with minimal human intervention.

System Overview and Examples of Operation

FIG. 1 is a system view of an example computing environment 100 illustrating a monitoring node 104 to monitor health of an application based on historical application health data and application logs. Example computing environment 100 may be a networked computing environment such as an enterprise computing environment, a cloud computing environment, a virtualized environment, a cross-cloud computing environment, or the like. As shown in FIG. 1, computing environment 100 may include multiple compute nodes 102A-N and monitoring node 104 that is in communication with compute nodes 102A-N over one or more networks 106. Each of compute nodes 102A-N may refer to a computing device or computer program (i.e., executing on a computing device) that requests services from monitoring node 104.

Example compute nodes 102A-N may include, but not limited to, physical computing devices, virtual machines, containers, or the like. The virtual machines, in some embodiments, may operate with their own guest operating systems on a physical computing device using resources of the physical computing device virtualized by virtualization software (e.g., a hypervisor, a virtual machine monitor, and the like). A container is a data computer node that runs on top of a host operating system without the need for a hypervisor or separate operating system. Monitoring node 104 may refer to a computing device or computer program (i.e., executing on a computing device) that provides some service to compute nodes 102A-N or applications (e.g., app 1 to app N) executing on compute nodes 102A-N. Compute nodes 102A-N and monitoring node 104 may communicate over communication links (e.g., networks 106). Communication is according to a protocol, which may be a message-based protocol.

Example network 106 can be a managed Internet protocol (IP) network administered by a service provider. For example, network 106 may be implemented using wireless protocols and technologies, such as Wi-Fi, WiMAX, and the like. In other examples, network 106 can also be a packet-switched network such as a local area network, wide area network, metropolitan area network, Internet network, or other similar type of network environment. In yet other examples, network 106 may be a fixed wireless network, a wireless local area network (LAN), a wireless wide area network (WAN), a personal area network (PAN), a virtual private network (VPN), intranet or other suitable network system and includes equipment for receiving and transmitting signals. Network 106 can also have a hard-wired connection to compute nodes 102A-N.

In some examples, each of compute nodes 102A-N may include a processing resource/processor and memory. Example processor can be custom made or commercially available processor, a central processing unit (CPU), an auxiliary processor among several processors associated with compute nodes 102A-N, a semiconductor-based microprocessor (in the form of a microchip or chip set, for example), a macro processor, or generally any device for executing computer-readable program code. Example memory may be a computer-readable storage medium. In some examples, memory can have a distributed architecture, where various components are situated remote from one another, but can be accessed by compute nodes 102A-N. Processors may be configured to execute software stored within associated one of memories, to communicate data to and from the memory, and to generally control operations of compute nodes 102A-N pursuant to the computer-readable program code. Example non-transitory computer readable medium is an electronic, magnetic, optical, or other physical device or means that can contain or store a computer program for use by or in connection with a computer related system. The computer-readable program code in the non-transitory computer-readable medium may include one or more separate programs and may be in the form of a source program, executable program (object code), script, or any other entity comprising a set of instructions to be performed.

Examples described in FIG. 1 may depict monitoring node 104 in communication with compute nodes 102A-N, however, in some examples, a group of monitoring nodes or a cluster of monitoring nodes can communicate with multiple compute nodes 102A-N over one or more networks 106 to provide services to compute nodes 102A-N. Further, numerous types of applications may be supported on computing environment 100. For example, computing environment 100 may include a plurality of applications (i.e., app 1 to app N) running on corresponding compute nodes 102A-N. Further, each of the plurality of applications (i.e., app 1, app 2, and the like) may include one or more services (e.g., service 1 and service 2 corresponding to the app 1, service 3 and service 4 corresponding to the app 2, and the like) running therein.

The applications (i.e., app 1, app 2, and the like) may generate application logs including information about events or activities performed by the applications to facilitate technical support and troubleshooting of the applications. Further, the application logs may include service logs associated with the services (e.g., service 1, service 2, and the like). For example, the application logs may include short messages, the source of the records, timestamps of the events, log levels (e.g., fatal, error, warning, info, debug, trace, and the like) specifying the importance of the records, and/or the like. In other examples, the application logs may include a detailed sequence of statements that describe the events occurred during an operation of the application such as errors, exceptions, anomalies, and the like. Further, the application logs may be saved in a historical health data and log inventory 110. Furthermore, historical health data and log inventory 110 may store historical application health data associated with the plurality of applications (i.e., app 1 to app N). Also, real-time application logs may be sent to a real-time log inventory 120 for further analysis (e.g., to monitor the health of the applications (i.e., app 1, app 2, and the like) based on the saved application logs or historical application logs).

Monitoring node 104 may include a data training unit 108 and a real-time application monitoring unit 118. In one example, data training unit 108 may include a diagnosis model 112 and a component model 114 to train an application regression model 116. Further, real-time application monitoring unit 118 may monitor the health of the applications (i.e., app 1, app 2, and the like) using application regression model 116 based on the real-time application logs.

During operation, data training unit 108 may obtain the historical application health data and the historical application logs associated with an application (i.e., app 1) for a period. In one example, historical application health data may include historical service health data of the services. For example, the historical application health data may include time series data depicting relationship between application health and corresponding services health. In another example, the historical application logs may include historical service logs of the services. Further, the obtained historical application health data and the historical application logs may be divided or split into training data (e.g., the historical application health data and the historical application logs associated with a portion of the period) and testing data (e.g., the historical application health data and the historical application logs associated with a remaining portion of the period).

Data training unit 108 may determine priority of services associated with the application (e.g., app 1) based on the historical application health data associated with a portion of the period (e.g., training data). In one example, data training unit 108 may analyze criticality of the services using trained diagnosis model 112 by correlating the historical application health data with the associated historical services health data of the portion of the period. Further, data training unit 108 may determine the priority of the services by assigning weightages to the services based on the criticality of the services.

Further, data training unit 108 may determine priority of exceptions associated with each of the services based on the historical application health data and the historical application logs associated with the portion of the period (e.g., training data). In one example, data training unit 108 may determine the exceptions associated with each of the services by analyzing the historical service logs using trained component model 114. An exception is an event, which occurs during the execution of a service associated with the application (i.e., app 1), that may disrupt the normal flow of the instructions. For example, when an error occurs within a method, the method throws an exception. The exception includes information about the error, including its type and the state of the program when the error occurred.

Further, data training unit 108 may analyze criticality of the exceptions associated with each of the services using trained component model 114 by correlating each exception with the associated historical services health data and the associated historical application health data. Based on the criticality of the exceptions, data training unit 108 may determine the priority of the exceptions by assigning weightages to the exceptions. In one example, diagnosis model 112 and component model 114 may be trained on input words and/or strings of words using supervised machine learning and natural language processing methods. For example, input words and/or the strings of words may be selected from the historical application health data and the historical application logs using the supervised machine learning and the natural language processing methods.

Furthermore, data training unit 108 may train application regression model 116 by correlating the priority of the services, the priority of the exceptions associated with each of the services, and the corresponding historical application health data. Further, data training unit 108 may test trained application regression model 116 based on the testing data (e.g., the historical application health data and the historical application logs associated with the remaining portion of the period). Training and testing of application regression model 116 are described in detail in FIGS. 2A and 2B.

Real-time application monitoring unit 118 may retrieve the real-time application logs from real-time log inventory 120. In one example, real-time log inventory 120 may be used to index the real-time application logs generated by the application (i.e., app 1). Further, the real-time application monitoring unit 118 may predict the health of the application (i.e., app 1) for an upcoming period by analyzing the real-time application logs using trained and tested application regression model 116. Real-time monitoring of the application is described in FIGS. 3A and 3B.

In one example, the applications may be managed to perform a management function on the applications based on the monitoring. For example, an alert may be generated, a condition may be defined for triggering an alert, access rights may be managed, and/or the real-time application health data may be used to troubleshoot the applications. Using application health monitoring, organizations may be able to overcome the complexities of modern applications and data centers, and mitigate the risks involved with unpredictable application performance. Further, by monitoring the health of the application using the trained application regression model, performance issues can be identified and application service delivery can be improved.

In one example, data training unit 108 and real-time application monitoring unit 118 may be implemented as engines or modules including any combination of hardware, firmware, programming, or a combination thereof to implement the functionalities described herein. Monitoring node 104 can be a service process in the management application or can be an appliance running in the data center to cater multiple management applications in a cloud-based environment. For example, management application may be vSphere virtual center that is offered by VMware. Management application may be hosted or deployed in a physical server, VM, or container.

In some examples, the functionalities described herein, in relation to instructions to implement functions of data training unit 108 and real-time application monitoring unit 118, and any additional instructions described herein in relation to the storage medium, may be implemented as engines or modules including any combination of hardware and programming to implement the functionalities of the modules or engines described herein. The functions of data training unit 108 and real-time application monitoring unit 118 may also be implemented by a respective processor. In examples described herein, the processor may include, for example, one processor or multiple processors included in a single device or distributed across multiple devices.

Figure 2A:
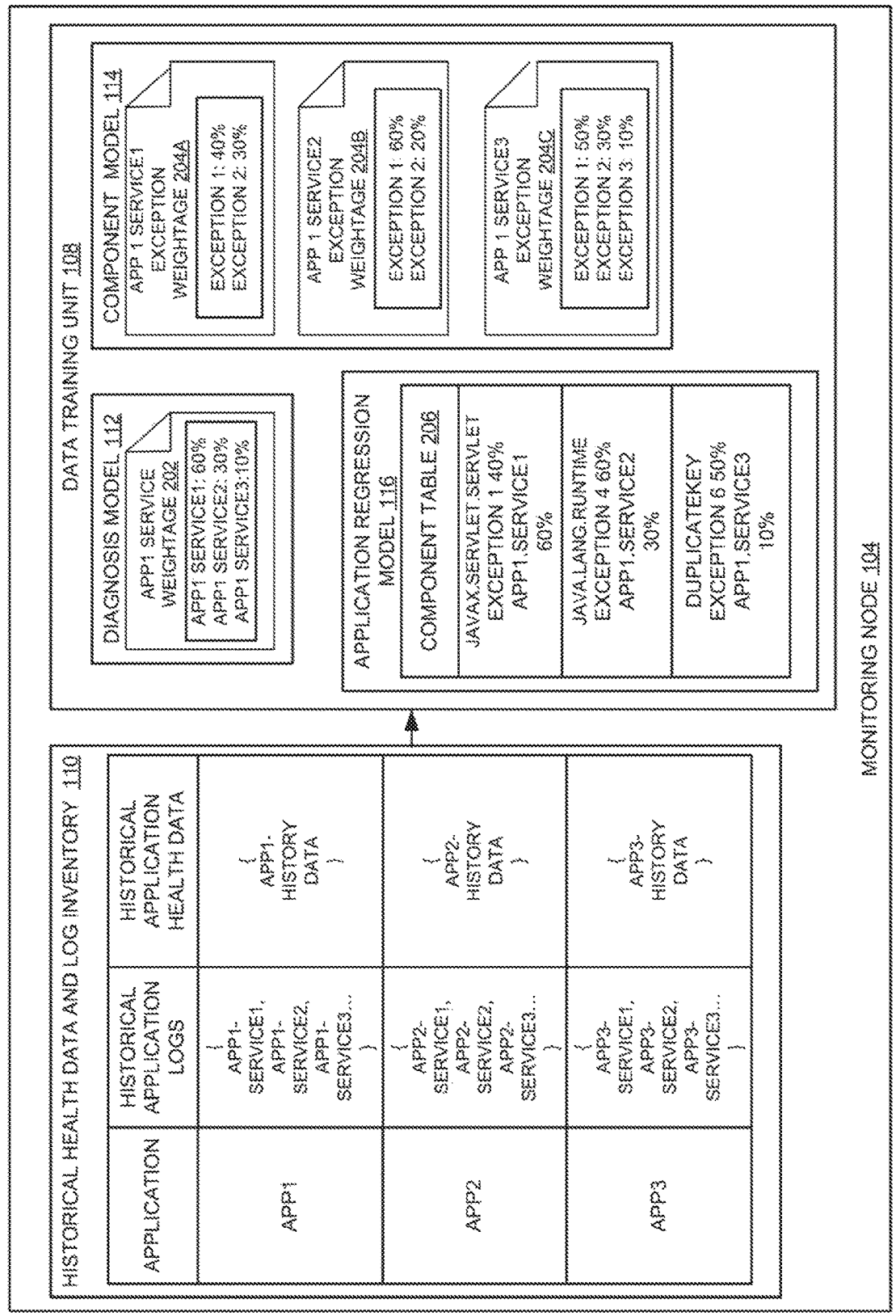
FIG. 2A is a block diagram of an example monitoring node illustrating a data training unit to train an application regression model.

FIG. 2A is a block diagram of example monitoring node 104 of FIG. 1 illustrating data training unit 108 to train application regression model 116. As shown in FIG. 2A, monitoring node 104 may include data training unit 108, and a historical health data and log inventory 110. In one example, data training unit 108, and historical health data and log inventory 110 can be resided in one computing system or can be resided in different computing systems in a cloud environment. Further, data training unit 108 may communicate with historical health data and log inventory 110 either directly or over a network (e.g., over a local-area network, wide-area network, wireless network, or the like). Historical health data and log inventory 110 may include historical application health data and historical application logs. For example, the historical application health data can be obtained and stored in historical health data and log inventory 110 using monitoring tools such as VMware vRealize Operations (vROPS). vROPS may combine multiple VMware components to deliver integrated performance, capacity, and configuration management capabilities for VMware vSphere, physical and hybrid cloud environments.

The historical application health data may include health availability time series data of the application and corresponding services. Further, historical health data and log inventory 110 may include the historical application logs having corresponding service logs of the services associated with the application. Example historical health data and log inventory 110 of FIG. 2A stores the historical application health data and the historical application logs (e.g., including services logs) associated with the applications (e.g., app 1, app 2, and app 3). Further, historical health data and log inventory 110 may provide subscribed end-points to index the application logs and associated service logs of the applications (i.e., app 1, app 2, and app 3).

Data training unit 108 may go through the historical application health data and the historical application logs to analyze the behavior of the application based on behavior of services associated with the application. In one example, data training unit 108 may use trained diagnosis model 112 and trained component model 114 to determine priority of services (e.g., app 1 service weightage 202) and priority of exceptions (e.g., app 1 service 1 exception weightage 204A, app 1 service 2 exception weightage 204B, and app 1 service 3 exception weightage 204C) associated with the services. Further, the priority of services (e.g., app 1 service weightage 202) and the priority of exceptions (e.g., app 1 service 1 exception weightage 204A, app 1 service 2 exception weightage 204B, and app 1 service 3 exception weightage 204C) may be used to train application regression model 116. Trained application regression model 116 may include component table 206 to store weightages of the services and the associated exceptions. The terms "diagnosis bot" and "diagnosis model" are used interchangeably throughout the document. Further, the terms "component bot" and "component model" are used interchangeably throughout the document. An example process for training application regression model 116 is explained in FIG. 2B.

Figure 2B:
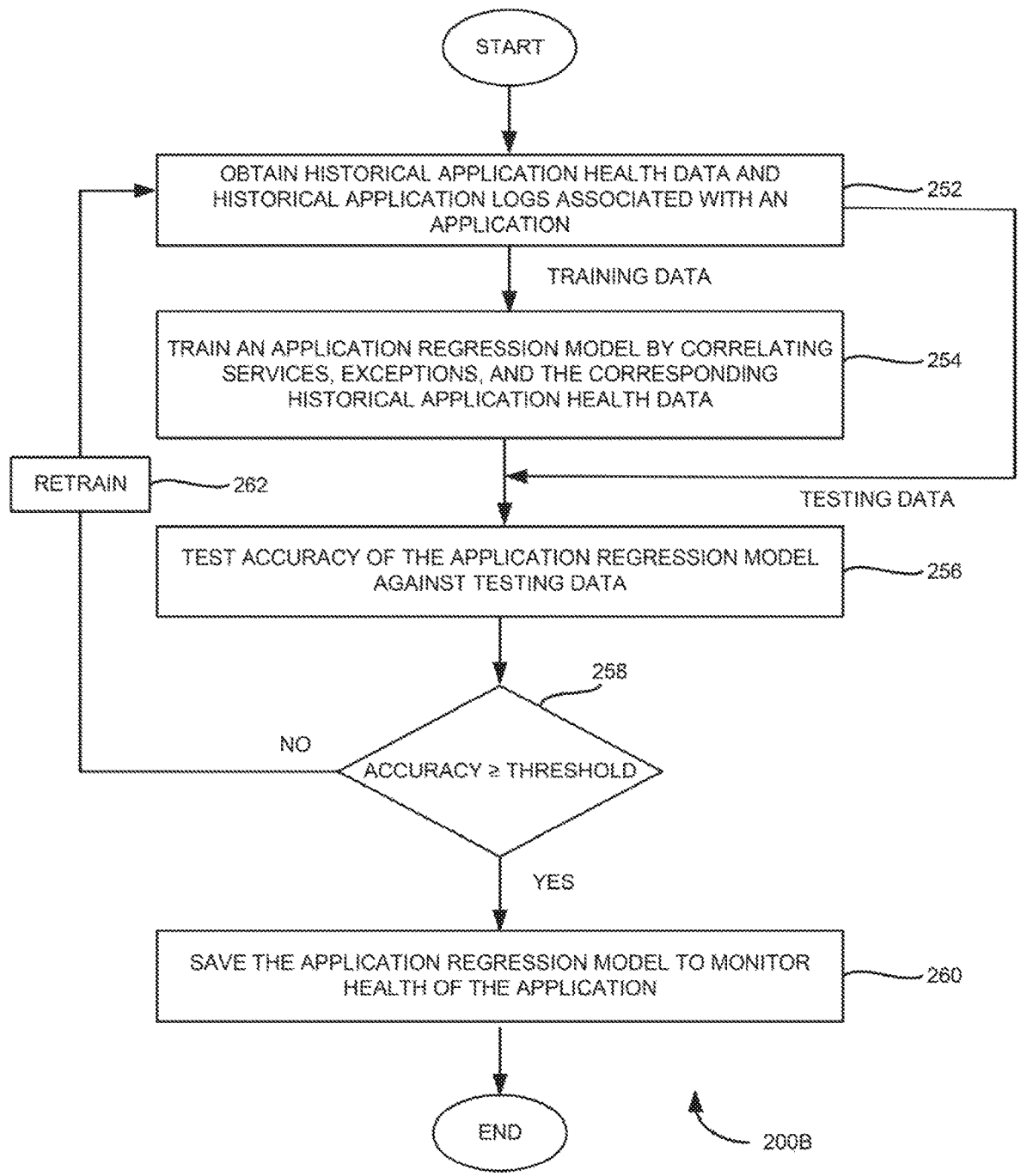
FIG. 2B is an example process associated with the data training unit of FIG. 2A.

Referring now to FIG. 2B, which is an example process 200B associated with the data training unit 108 of FIG. 2A. At 252, historical application health data and historical application logs associated with the application may be obtained for a period. The obtained historical application health data and the historical application logs may be divided into training data (e.g., the historical application health data and the historical application logs associated with a portion of the period) and testing data (e.g., the historical application health data and the historical application logs associated with a remaining portion of the period). The training data may be used to train application regression model 116. Further, the effectiveness or accuracy of trained application regression model 116 may be determined by running application regression model 116 against the testing data.

At 254, application regression model 116 may be trained by correlating services (e.g., the priority of services), exceptions (e.g., the priority of exceptions), and the corresponding historical application health data. In one example, the priority of the services may be determined using diagnosis bot 112 based on the historical application health data corresponding to the training data. Example historical application health data is shown in Table 1.

TABLE 1

| Component | $0^{th}$ minute | $5^{th}$ minute | $10^{th}$ minute | $15^{th}$ minute |
|---|---|---|---|---|
| Service 1 | 1 | 0 | 0 | 0 |
| Service 2 | 1 | 0 | 1 | 0 |
| Application | 1 | 0 | 0 | 0 |

Table 1 depicts health availability time series data associated with the application and corresponding services (e.g., service 1 and service 2) for a particular interval of time. In table 1, service availability uptime is depicted as '1' and downtime as '0.' Diagnosis bot 112 may be used to analyze criticality of the services (e.g., service 1 and service 2) by correlating the historical application health data with the associated historical services health data. In one example, the priority of the services may be determined by assigning weightages to the services (e.g., service 1 and service 2) based on the criticality of the services. In the example shown in Table 1, the application is down in the $3^{rd}$ time slice (e.g., at $10^{th}$ minute) when service 1 is down. Thereby, diagnosis bot 112 can learn that service 1 has to be given more weightage than service 2. For example, weightages to the services may be assigned using equations (1) and (2).

$$F(X_i) = \sum_{j=1}^{N} A_{(ij)} * S_j \quad (1)$$

$$\begin{bmatrix} A_{11} & A_{12} & - & - & - & A_{1N} \\ A_{21} & A_{22} & - & - & - & A_{2N} \\ - & - & - & - & - & - \\ - & - & - & - & - & - \\ - & - & - & - & - & - \\ A_{N1} & A_{N2} & - & - & - & A_{NN} \end{bmatrix} \begin{bmatrix} S_1 \\ S_2 \\ - \\ - \\ - \\ S_N \end{bmatrix} = \begin{bmatrix} X_1 \\ X_2 \\ - \\ - \\ - \\ X_N \end{bmatrix} \quad (2)$$

In equations (1) and (2), $X_i$ is availability of the application at time slice i, $S_j$ is weightage of service j, $A_{(ij)}$ is availability of service j at time slice i, and N is number of services. In the example shown in app 1 service weightage 202 of FIG. 2, service 1 is assigned 60% of weightage, service 2 is assigned 30% of weightage, and service 3 is assigned 10% of weightage. Therefore, determining the service weightages can assist in identifying the percentage change in the health of the application when the service goes down.

Upon determining priority of the services or weightages to the services, priority of the exceptions associated with each of the services (e.g., service 1, service 2 and service 3) may be determined using component bot 114. Component bot 114 may analyze the historical service logs in the application logs to identify/determine the exceptions and its trace associated with each of the services. Further, criticality of the exceptions may be determined by correlating each exception with the associated historical services health data and the associated historical application health data. Example historical service logs and corresponding service health data associated with the service 1 is depicted in Table 2.

TABLE 2

| Time-Series | $0^{th}$ minute | $5^{th}$ minute | $10^{th}$ minute |
| --- | --- | --- | --- |
| Service 1 | 0 (down) | 1 (up) | 0 (down) |
| Exception 1 | False | True | True |
| Exception 2 | False | True | False |
| Exception 3 | True | False | True |

Table 2 depicts health availability time series data associated with the service 1 for a particular interval of time based on three exceptions (e.g., exception 1: index out of bounds, exception 2: null pointer exception, and exception 3: out of memory error). Service availability uptime is depicted as '1' and downtime as '0.' In the example table 2, service 1 is down in the $1^{st}$ time slice (e.g., at $0^{th}$ minute) and the 3rd time slice (e.g., at $10^{th}$ minute) when exception 3 occurred. Thereby, component bot 114 can learn that exception 3 has to be given more weightage than other two exceptions. The priority of the exceptions is determined by assigning weightages to the exceptions based on the criticality of the exceptions. In one example, a high weightage is assigned to an exception if the exception has caused the health of a critical service to go down. For example, component bot 114 may use the below algorithm and weight calculation vector as shown in equation (3) to determine or update the weightage of the exceptions.

```
Parse through application log;
For all Exception or error E do
{
    W = CALCULATE-WEIGHT(E);
    if COMPONENT-TABLE-EXISTS(E) then
    {
        UPDATE-COMPONENT-TABLE(E,W);
    }
    else
    {
        ADD-COMPONENT-TABLE(E,W);
    }
}
```
$$\vec{w} = A\vec{x} + B\vec{y} + C\vec{z} \qquad (3)$$

In equation (3), 'w' represents exception weight vector, 'x' represents application health vector, 'y' represents service weight vector, and 'z' represents service health vector. In the example shown in app 1 service 1 exception weightage 204A, exception 1 is assigned 40% of weightage and exception 2 is assigned 30% of weightage. Therefore, determining the exception weightages can assist in identifying the percentage change in the health of the service.

In one example, upon training application regression model 116, application regression model 116 may include a data structure referred as component table 206, whose key is a unique stack trace of an exception occurring in the application service logs and value is the weight percentage. Therefore, the outcome of data training unit 108 may be application regression model 116 including component table 206 that serves as a reference for determining the application health in future.

At 256, accuracy of the trained application regression model 116 may be tested against testing data. During a testing phase, a check is made to determine whether the accuracy of application regression model 116 is greater than or equal to a predefined threshold, at 258. During the testing phase, application health data may be predicted for the remaining portion of the period using trained application regression model 116. Further, the accuracy of trained application regression model 116 may be determined by comparing the predicted health data of the application with the historical application health data associated with the remaining portion of the period (i.e., testing data).

At 260, when the accuracy is greater than or equal to the predefined threshold, trained application regression model 116 may be saved and used to monitor the health data of the application for an upcoming period. At 262, when the accuracy is less than the predefined threshold, the trained application regression model 116 may be retrained with historical application health data and historical application logs associated with a modified period (e.g., different period) and the steps 252-258 may be repeated. For example, retraining application regression model 116 may include retraining diagnosis bot 112 and component bot 114.

Figure 3A:
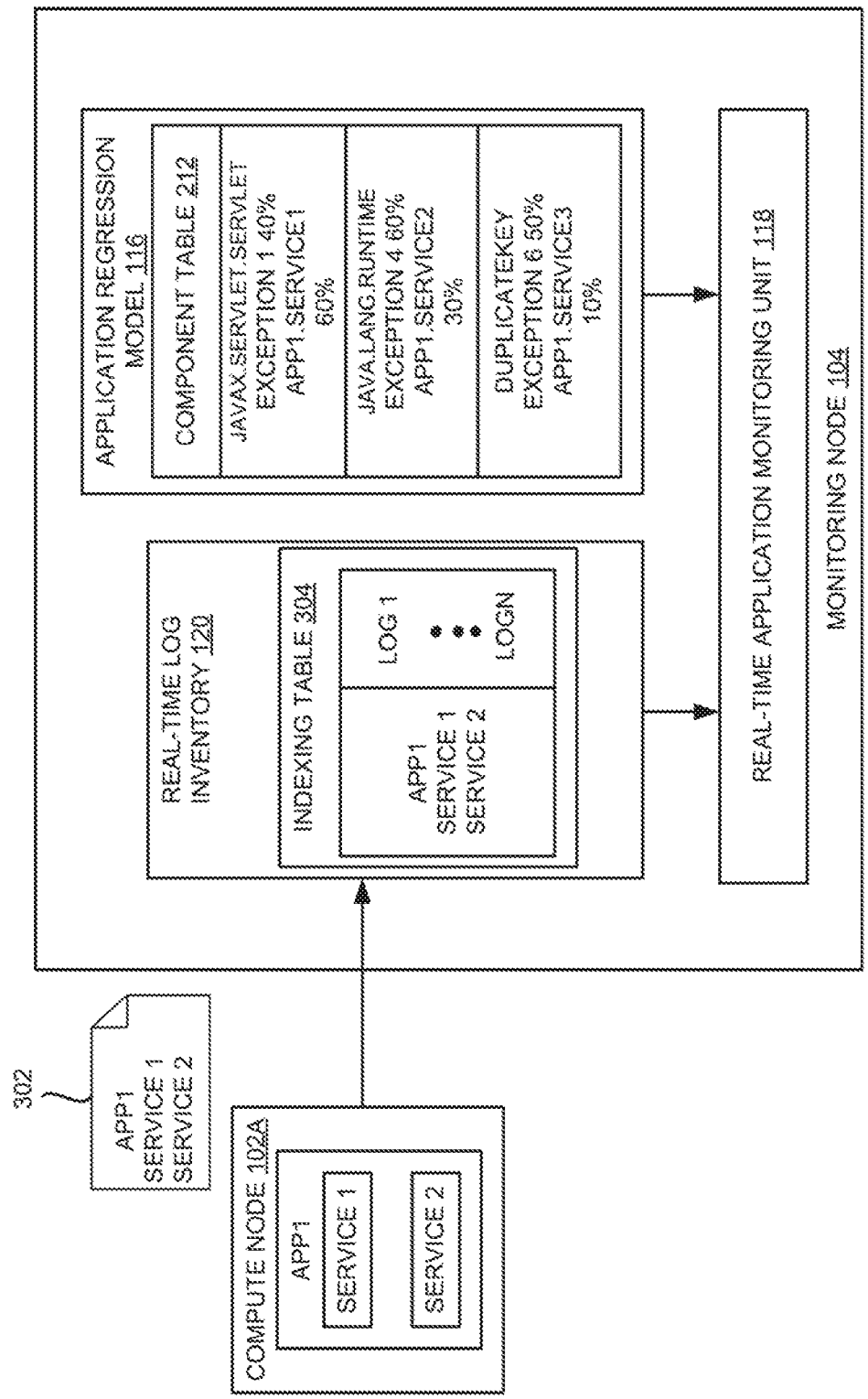
FIG. 3A is a block diagram of an example monitoring node illustrating a real-time application monitoring unit to dynamically monitor health of an application.

FIG. 3A is a block diagram of example monitoring node 104 of FIG. 1 illustrating real-time application monitoring unit 118 to dynamically monitor health of an application. As shown in FIG. 3A, monitoring node 104 is in communication with compute node 102A. Monitoring node 104 may include real-time log inventory 120, application regression model 116, and real-time application monitoring unit 118. As shown in FIG. 3A, real-time application logs 302 including associated real-time application service logs may be collected and indexed in real-time log inventory 120. Real-time log inventory 120 may provide subscribed end-points to index application logs generated by an application (i.e., app 1). Real-time log inventory 120 may maintain an indexing table 304, which may include a hash-based data structure where each entry associated with application logs 302 may maintain a resource key to identify a host application and a value as a list of log files. Application regression model 116 is a trained model including component table 212 (e.g., as described in FIGS. 2A and 2B).

During real-time operation, application monitoring unit 118 may monitor the health of the application by analyzing the application logs in indexing table 304 using application regression model 116. An example flow diagram illustrating monitoring the health of the application using application regression model 116 is explained in FIG. 3B.

Figure 3B:
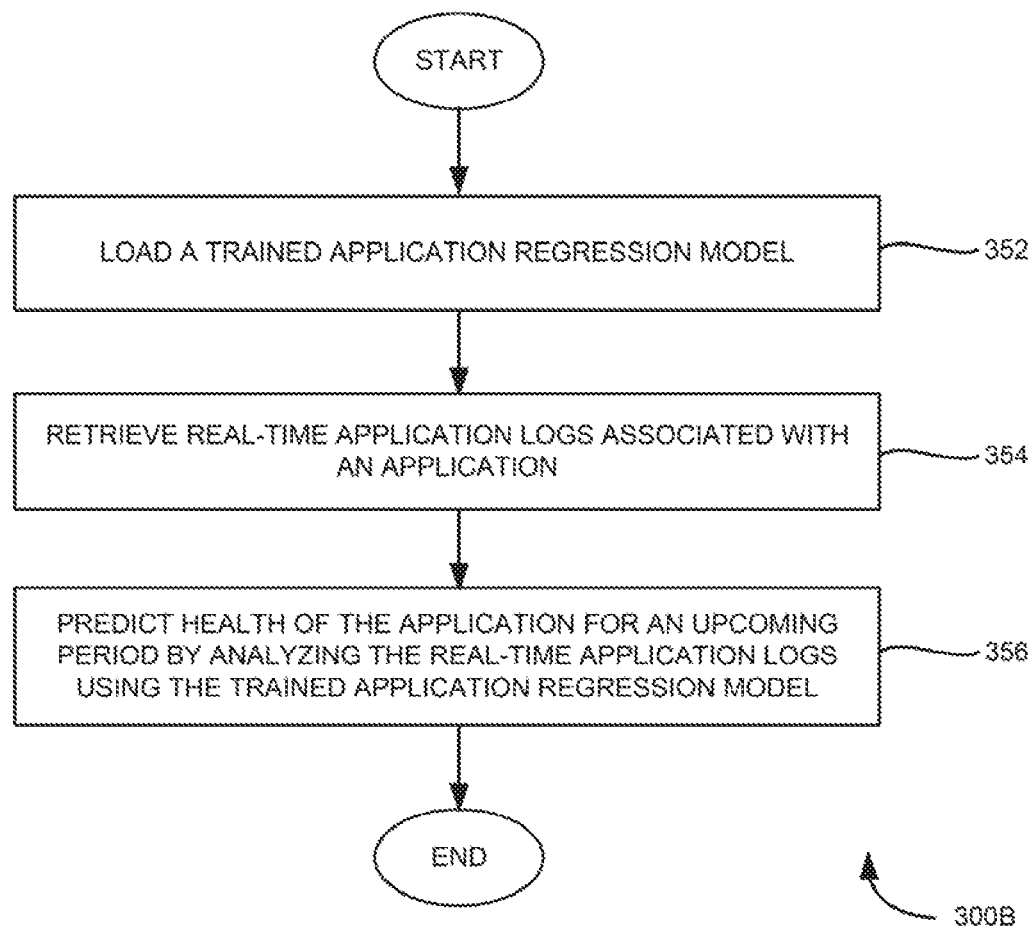
FIG. 3B is an example process associated with the real-time application monitoring unit of FIG. 3A.

Referring now to FIG. 3B, which is an example process 300B associated with real-time application monitoring unit 118 of FIG. 3A. At 352, trained application regression model 116 is loaded. Trained application regression model 116 may include component table 212 specifying priorities or weightage of services and exceptions associated with the application. At 354, real-time application logs associated with the application may be retrieved. The real-time application logs may include application service logs. The application service logs include exceptions occurred during execution of the services in the application.

At 356, the health of the application may be predicted for the upcoming period by analyzing the real-time application logs using trained application regression model 116. In one example, real-time application monitoring unit 118 may scan through the application service logs to identify logging of an exception and determine the health of the application based on weightage of the exception in component table 212.

Examples described herein may be implemented in client-server systems. For example, monitoring node may be a vRealize™ Operations Manager (vROPS), Log Insight™ vRealize Automation®, vRealize Business, and/or Hyperic® that are offered by VMware. Examples described herein can be implemented in software as a service (SAAS), where the server communicating with multiple compute nodes (i.e., clients/agents/probes/slaves) could receive log files generated by the applications running on the multiple compute nodes.

The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 4:
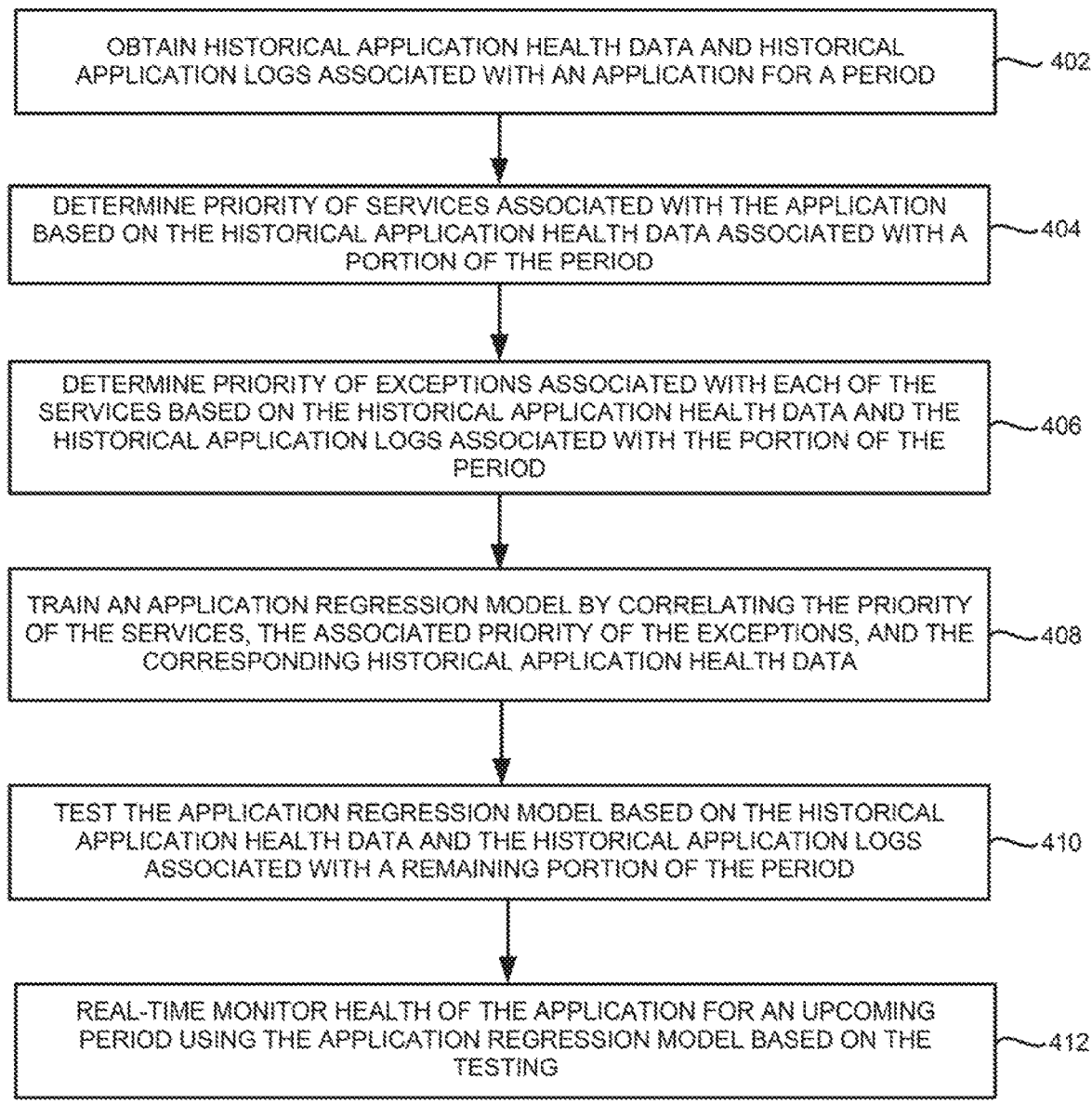
FIG. 4 is an example flow diagram illustrating monitoring health of an application based on historical application health data and application logs.

FIG. 4 is an example flow diagram 400 illustrating monitoring health of an application based on historical application health data and application logs. It should be understood that the process depicted in FIG. 4 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 402, historical application health data and historical application logs associated with the application may be obtained for a period. At 404, priority of services associated with the application may be determined based on the historical application health data associated with a portion of the period. At 406, priority of exceptions associated with each of the services may be determined based on the historical application health data and the historical application logs associated with the portion of the period.

At 408, an application regression model may be trained by correlating the priority of the services, the associated priority of the exceptions, and the corresponding historical application health data. At 410, the application regression model may be tested based on the historical application health data and the historical application logs associated with a remaining portion of the period.

At 412, the health of the application may be monitored in real-time for an upcoming period using the application regression model based on the testing. In one example, real-time monitoring the health of the application may include retrieving real-time application logs associated with the application, and predicting the health of the application for the upcoming period by analyzing the real-time application logs using the application regression model.

Figure 5:
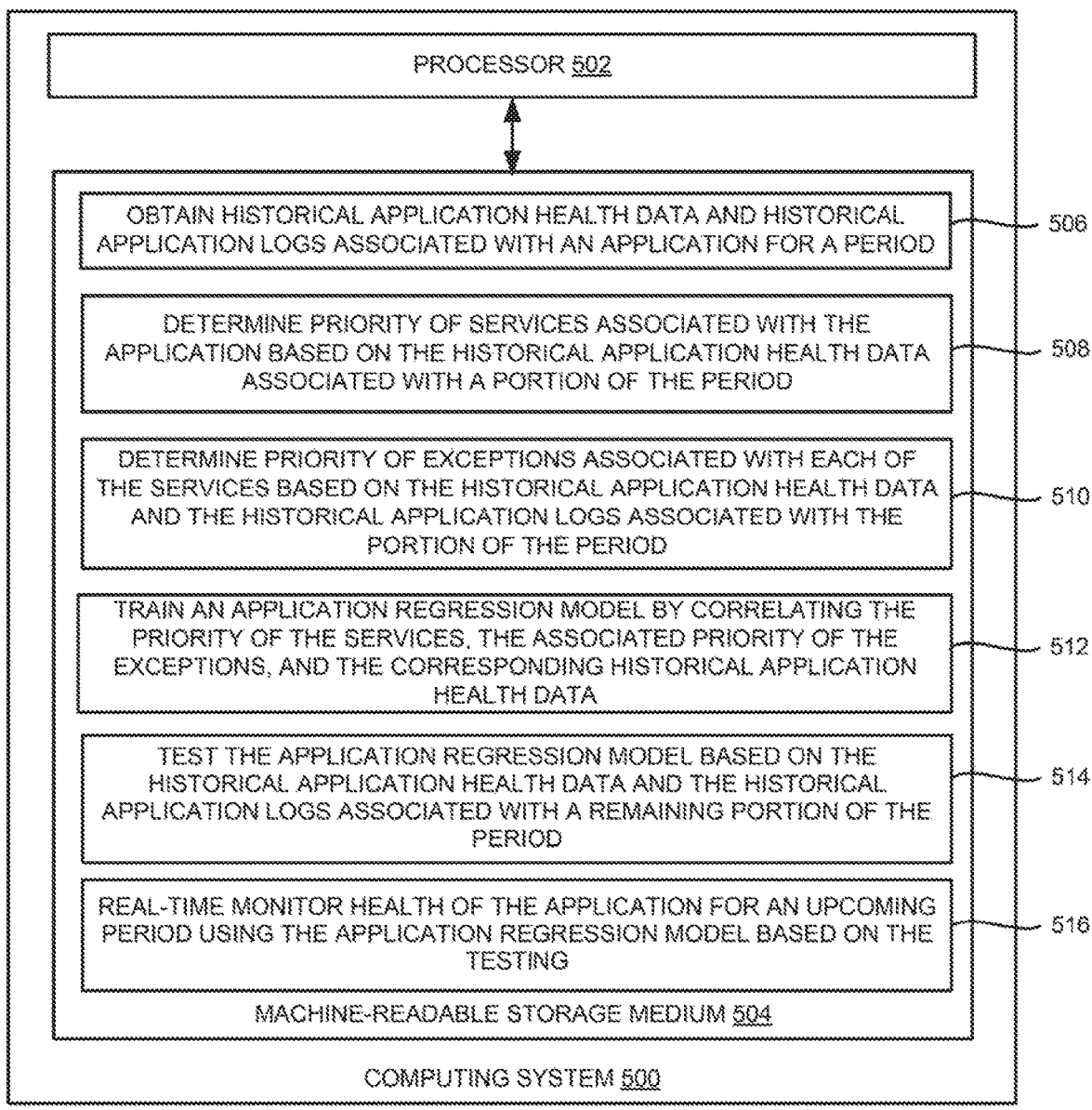
FIG. 5 is a block diagram of an example computing system including a non-transitory computer-readable storage medium, storing instructions to monitor health of an application based on historical application health data and application logs.

FIG. 5 is a block diagram of an example computing system 500 (e.g., monitoring nodes 104 of FIGS. 1, 2, and 4) including non-transitory computer-readable storage medium, storing instructions to discover applications through application logs. The computing system 500 may include a processor 502 and a machine-readable storage medium 504 communicatively coupled through a system bus. The processor 502 may be any type of central processing unit (CPU), microprocessor, or processing logic that interprets and executes machine-readable instructions stored in the machine-readable storage medium 504. The machine-readable storage medium 504 may be a random-access memory (RAM) or another type of dynamic storage device that may store information and machine-readable instructions that may be executed by the processor 502. For example, the machine-readable storage medium 504 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 504 may be a non-transitory machine-readable medium. In an example, the machine-readable storage medium 504 may be remote but accessible to computing system 500.

The machine-readable storage medium 504 may store instructions 506-516. In an example, instructions 506-516 may be executed by processor 502 for monitoring the health of the application using historical application health data and application logs. Instructions 506 may be executed by processor 502 to obtain the historical application health data and the historical application logs associated with the application for a period. Instructions 508 may be executed by processor 502 to determine priority of services associated with the application based on the historical application health data associated with a portion of the period. Instructions 510 may be executed by processor 502 to determine priority of exceptions associated with each of the services based on the historical application health data and the historical application logs associated with the portion of the period. Instructions 512 may be executed by processor 502 to train an application regression model by correlating the priority of the services, the associated priority of the exceptions, and the corresponding historical application health data. Instructions 514 may be executed by processor 502 to test the application regression model based on the historical application health data and the historical application logs associated with a remaining portion of the period. Further, instructions 516 may be executed by processor 502 to real-time monitor the health of the application for an upcoming period using the application regression model based on the testing.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A method comprising:
    obtaining historical application health data and historical application logs associated with an application for a period;
    determining priority of services associated with the application based on the historical application health data associated with a portion of the period;
    determining priority of exceptions associated with each of the services based on the historical application health data and the historical application logs associated with the portion of the period;
    training an application regression model by correlating the priority of the services, the associated priority of the exceptions, and the corresponding historical application health data;
    testing the application regression model based on the historical application health data and the historical application logs associated with a remaining portion of the period; and
    predicting health of the application for an upcoming period using the application regression model based on the testing.

2. The method of claim 1, wherein predicting the health of the application comprises:
    retrieving real-time application logs associated with the application; and
    predicting the health of the application for the upcoming period by analyzing the real-time application logs using the application regression model.

3. The method of claim 1, wherein testing the application regression model comprises:
    predicting health data of the application for the remaining portion of the period using the trained application regression model; and
    determining accuracy of the trained application regression model by comparing the predicted health data of the application with the historical application health data associated with the remaining portion of the period, wherein the trained application regression model is used to predict the health data of the application for the upcoming period when the accuracy is greater than or equal to a predefined threshold.

4. The method of claim 3, further comprising:
    retraining the trained application regression model with historical application health data and historical application logs associated with a modified period when the accuracy is less than the predefined threshold.

5. The method of claim 1, wherein the historical application health data comprise historical services health data of the services, and the historical application logs comprise historical service logs of the services.

6. The method of claim 5, wherein determining the priority of the services comprises:
    analyzing criticality of the services using a trained diagnosis model by correlating the historical application health data with the associated historical services health data; and
    determining the priority of the services by assigning weightages to the services based on the criticality of the services.

7. The method of claim 6, wherein the diagnosis model is trained using supervised machine learning and natural language processing methods.

8. The method of claim 5, wherein determining the priority of the exceptions associated with each of the services comprises:
    determining the exceptions associated with each of the services by analyzing the historical service logs using a trained component model;
    analyzing criticality of the exceptions associated with each of the services using the trained component model by correlating each exception with the associated historical services health data and the associated historical application health data; and
    determining the priority of the exceptions by assigning weightages to the exceptions based on the criticality of the exceptions.

9. The method of claim 8, wherein the component model is trained using supervised machine learning and natural language processing methods.

10. A system comprising:
a data training unit is to:
obtain historical application health data and historical application logs associated with an application for a period;
determine priority of services associated with the application based on the historical application health data associated with a portion of the period;
determine priority of exceptions associated with each of the services based on the historical application health data and the historical application logs associated with the portion of the period;
train an application regression model by correlating the priority of the services, the associated priority of the exceptions, and the corresponding historical application health data; and
test the application regression model based on the historical application health data and the historical application logs associated with a remaining portion of the period; and
a real-time application monitoring unit is to predict health of the application for an upcoming period using the application regression model based on the testing.

11. The system of claim 10, wherein the real-time application monitoring unit is to:
retrieve real-time application logs associated with the application; and
predict the health of the application for the upcoming period by analyzing the real-time application logs using the application regression model.

12. The system of claim 10, wherein the data training unit is to:
predict health data of the application for the remaining portion of the period using the trained application regression model; and
determine accuracy of the trained application regression model by comparing the predicted health data of the application with the historical application health data associated with the remaining portion of the period, wherein the trained application regression model is used to predict the health data of the application for the upcoming period when the accuracy is greater than or equal to a predefined threshold.

13. The system of claim 12, wherein the data training unit is to:
retrain the trained application regression model with historical application health data and historical application logs associated with a modified period when the accuracy is less than the predefined threshold.

14. The system of claim 10, wherein the historical application health data comprise historical services health data of the services, and the historical application logs comprise historical service logs of the services.

15. The system of claim 14, wherein the data training unit is to:
analyze criticality of the services using a trained diagnosis model by correlating the historical application health data with the associated historical services health data; and
determine the priority of the services by assigning weightages to the services based on the criticality of the services.

16. The system of claim 14, wherein the data training unit is to:
determine the exceptions associated with each of the services by analyzing the historical service logs using a trained component model;
analyze criticality of the exceptions associated with each of the services using the trained component model by correlating each exception with the associated historical services health data and the associated historical application health data; and
determine the priority of the exceptions by assigning weightages to the exceptions based on the criticality of the exceptions.

17. A non-transitory machine-readable storage medium encoded with instructions that, when executed by a processor, cause the processor to:
obtain historical application health data and historical application logs associated with an application for a period;
determine priority of services associated with the application based on the historical application health data associated with a portion of the period;
determine priority of exceptions associated with each of the services based on the historical application health data and the historical application logs associated with the portion of the period;
train an application regression model by correlating the priority of the services, the associated priority of the exceptions, and the corresponding historical application health data;
test the application regression model based on the historical application health data and the historical application logs associated with a remaining portion of the period; and
predict health of the application for an upcoming period using the application regression model based on the testing.

18. The non-transitory machine-readable storage medium of claim 17, wherein predicting the health of the application comprises:
retrieving real-time application logs associated with the application; and
predicting the health of the application for the upcoming period by analyzing the real-time application logs using the application regression model.

19. The non-transitory machine-readable storage medium of claim 17, wherein testing the application regression model comprises:
predicting health data of the application for the remaining portion of the period using the trained application regression model; and
determining accuracy of the trained application regression model by comparing the predicted health data of the application with the historical application health data associated with the remaining portion of the period, wherein the trained application regression model is used to predict the health data of the application for the upcoming period when the accuracy is greater than or equal to a predefined threshold.

20. The non-transitory machine-readable storage medium of claim 19, further comprising instructions that, when executed by the processor, cause the processor to:
retrain the trained application regression model with historical application health data and historical application logs associated with a modified period when the accuracy is less than the predefined threshold.

21. The non-transitory machine-readable storage medium of claim 17, wherein the historical application health data comprise historical services health data of the services, and the historical application logs comprise historical service logs of the services.

22. The non-transitory machine-readable storage medium of claim 21, wherein determining the priority of the services comprises:
- analyzing criticality of the services using a trained diagnosis model by correlating the historical application health data with the associated historical services health data; and
- determining the priority of the services by assigning weightages to the services based on the criticality of the services.

23. The non-transitory machine-readable storage medium of claim 21, wherein determining the priority of the exceptions associated with each of the services comprises:
- determining the exceptions associated with each of the services by analyzing the historical service logs using a trained component model;
- analyzing criticality of the exceptions associated with each of the services using the trained component model by correlating each exception with the associated historical services health data and the associated historical application health data; and
- determining the priority of the exceptions by assigning weightages to the exceptions based on the criticality of the exceptions.

\* \* \* \* \*